United States Patent Office 3,324,184
Patented June 6, 1967

3,324,184
SYNTHESIS OF STEROIDS
Patrick A. Diassi, Westfield, N.J., assignor, by mesne assignments, to E. R. Squibb & Sons, Inc., New York, N.Y., a corporation of Delaware
No Drawing. Filed Apr. 30, 1965, Ser. No. 452,345
2 Claims. (Cl. 260—586)

This invention relates to the synthesis of steroids and, more particularly, to the provision of a new steroid, 12,21 - cyclo - A - nor - 14β,17α - pregna - 3,12(21)-diene-2,15,20-trione, having the formula

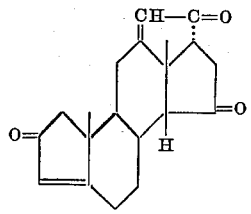

The new steroid of this invention is a physiologically active substance that possesses anti-androgenic activity (i.e., it inhibits the action of anhydrogens).

The compound is prepared by heating 12,15-diketo-A-norprogesterone with a strong base, such as sodium methoxide, as more fully described in the following example:

EXAMPLE (a) *Preparation of 12β,15α-dihydroxy-A-norprogesterone*

A 150 gallon fermentor containing 112 g. of A-norprogesterone in media containing corn steep liquor, $NH_4H_2PO_4$, $CaCO_3$, yeast extract, dextrose and soy bean oil is inoculated with a culture of *Colletotrichum linicolae* NCTC (National Collection of Type Cultures) No. 1194 (obtainable from the Commonwealth Mycological Institute, Kew, Surrey, England). After thirty-six hours, the whole broth is filtered and the filtrate extracted with one-half volume of chloroform in a Podbielniak extractor. The chloroform solution is washed with water, dried over sodium sulfate and evaporated to a crystalline mass. Trituration with 3×1000 ml. of hexane removes color and oil. The crude dry weight is 101.6 g. This material is recrystallized from acetone/hexane to give 67 g. of product which contains 11α,15α-dihydroxy-A-norprogesterone and 12β,15α-dihydroxy-A-norprogesterone.

The separation of these components is accomplished by column chromatography on 2300 g. alumina. Elution of the column with chloroform and continued elution with chloroform/methanol 200:1 and 100:1 gives 10.3 g. of 12β,15α-dihydroxy-A-norprogesterone.

(b) *Preparation of 12,15-diketo-A-norprogesterone*

105 mg. of 12β,15α-dihydroxy-A-norprogesterone is dissolved in 20 ml. of acetone. 0.5 ml. of 8 N chromic acid reagent is added and the solution held at room temperature for one hour. The excess reagent is destroyed with isopropanol, water added and the solution extracted with chloroform. The chloroform phase is washed with sodium carbonate, water, then dried over sodium sulfate and evaporated giving a crude product of 89 mg. Recrystallization from acetone/hexane gives 63 mg. of 12,15-diketo-A-norprogesterone.

(c) *Preparation of 12,21-cyclo-A-nor-14α,17β-pregna-3,12(21)-diene-2,15,20-trione*

A solution of 768 mg. of 12,15-diketo-A-norprogesterone in 152 ml. of 0.1 N sodium methoxide is refluxed under nitrogen for 1 hour. The green solution is then cooled, neutralized with dilute acetic acid, diluted with 100 ml. of water, and partially evaporated in vacuo. It is then diluted further with 100 ml. of water and extracted with chloroform. The chloroform extract is washed with water and evaporated. Crystallization of the residue from acetone-hexane gives about 343 mg. of 12,21 - cyclo - A - nor - 14β,17α - pregna - 3,12(21)-diene-2,15,20-trione, having a melting point about 254–256° C., $[\alpha]_D^{21}$ —217° (chloroform), $\lambda_{max.}^{alc.}$ 233 m$\mu$ ($\epsilon$, 28,400), $\lambda_{max.}^{Nujol}$ 5.77, 5.85, 5.91 (sh), 6.15$\mu$; $\tau_{CDCl_3}^{Si(Me)_4}$ 4.14 (S, 21-H), 4.20 (S, 3-H), 8.48 (S, 18-Me), 8.76 (S, 19-Me).

*Analysis.*—Calcd. for $C_{20}H_{22}O_3$ (310.38): C, 77.33; H, 7.14. Found: C, 77.65; H, 7.48.

The invention may be variously otherwise embodied within the scope of the appended claims.

What is claimed is:
1. 12,21 - cyclo - A - nor - 14β,17α - pregna - 3,12(21)-diene-2,15,20-trione.
2. A process for preparing 12,21-cyclo-A-nor-14β,17α-pregna-3,12(21)-diene-2,15,20-trione, which comprises heating 12,15-diketo-A-norprogesterone with sodium methoxide.

No references cited.

LEON ZITVER, *Primary Examiner.*

M. JACOB, *Assistant Examiner.*